US010899326B2

(12) United States Patent
Elstorpff et al.

(10) Patent No.: US 10,899,326 B2
(45) Date of Patent: Jan. 26, 2021

(54) RAIL VEHICLE BRAKING SYSTEM AND METHOD FOR OPERATING A RAIL VEHICLE BRAKING SYSTEM

(71) Applicant: KNORR-BREMSE SYSTEME FÜR SCHIENENFAHRZEUGE GMBH, Munich (DE)

(72) Inventors: Marc-Gregory Elstorpff, Munich (DE); Christian Mosbach, Alling (DE); Torsten Grunwald, Seehausen am Staffelsee (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 152 days.

(21) Appl. No.: 15/739,563

(22) PCT Filed: Jun. 27, 2016

(86) PCT No.: PCT/EP2016/064791
§ 371 (c)(1),
(2) Date: Dec. 22, 2017

(87) PCT Pub. No.: WO2016/207419
PCT Pub. Date: Dec. 29, 2016

(65) Prior Publication Data
US 2018/0170329 A1    Jun. 21, 2018

(30) Foreign Application Priority Data

Jun. 25, 2015    (DE) .................. 10 2015 110 229

(51) Int. Cl.
*B60T 8/17*    (2006.01)
*B60T 17/22*    (2006.01)
(Continued)

(52) U.S. Cl.
CPC .............. *B60T 8/1705* (2013.01); *B60T 8/58* (2013.01); *B60T 13/665* (2013.01);
(Continued)

(58) Field of Classification Search
CPC ........ B60T 8/1705; B60T 8/58; B60T 17/228; B60T 2240/07; B60T 13/665; B61H 5/00; B61H 13/20; B61H 13/34
See application file for complete search history.

(56) References Cited

U.S. PATENT DOCUMENTS

| 3,640,586 A | 2/1972 | Kohler |
| 4,347,569 A | 8/1982 | Allen, Jr. et al. |

(Continued)

FOREIGN PATENT DOCUMENTS

| DE | 4225683 A1 | 2/1994 |
| DE | 10245207 C1 | 10/2003 |

(Continued)

OTHER PUBLICATIONS

Search Report and Written Opinion for International Patent Application No. PCT/EP2016/064791 dated Sep. 26, 2016.

*Primary Examiner* — Adam R Mott
(74) *Attorney, Agent, or Firm* — Barnes & Thornburg LLP

(57) ABSTRACT

A rail vehicle braking system includes at least one disk brake associated with a wheel or a wheel set, wherein the disk brake includes at least one brake disk, at least one brake lining which engages with the brake disk, at least one application device exerting an application force on the at least one brake lining during a braking operation, and a control device for controlling the application device, wherein the control device is coupled to a determination unit for determining a current wheel diameter of the wheel or of the wheel set, wherein the control unit is configured such (Continued)

that, when a predetermined application force is actuated during braking operation, a value of the current wheel diameter detected by the determination unit is taken into account.

8 Claims, 2 Drawing Sheets

(51) Int. Cl.
*B60T 13/66* (2006.01)
*B60T 8/58* (2006.01)
*B61H 5/00* (2006.01)
*B61H 13/20* (2006.01)
*B61H 13/34* (2006.01)

(52) U.S. Cl.
CPC .............. *B60T 17/228* (2013.01); *B61H 5/00* (2013.01); *B61H 13/20* (2013.01); *B61H 13/34* (2013.01); *B60T 2240/07* (2013.01)

(56) References Cited

U.S. PATENT DOCUMENTS

| | | | | |
|---|---|---|---|---|
| 4,432,229 A | * | 2/1984 | Nowogrodzki | ........... G01P 3/56 73/146 |
| 4,819,168 A | * | 4/1989 | Laskey | ................ B60T 8/1705 180/197 |
| 6,148,269 A | | 11/2000 | Kumar et al. | |
| 7,234,567 B2 | | 6/2007 | Wagner et al. | |
| 2006/0151261 A1 | * | 7/2006 | Wagner | ................. B60T 13/741 188/72.9 |
| 2007/0046220 A1 | | 3/2007 | Alton, Jr. et al. | |
| 2014/0365046 A1 | | 12/2014 | Madsen | |

FOREIGN PATENT DOCUMENTS

| | | |
|---|---|---|
| EP | 0876944 A2 | 11/1998 |
| WO | 2009100498 A1 | 8/2009 |

* cited by examiner

RAIL VEHICLE BRAKING SYSTEM AND METHOD FOR OPERATING A RAIL VEHICLE BRAKING SYSTEM

PRIORITY CLAIM

This patent application is a U.S. National Phase of International Patent Application No. PCT/EP2016/064791, filed Jun. 27, 2016, which claims priority to German Patent Application No. 10 2015 110 229.3, filed Jun. 25, 2015, the disclosures of which are incorporated herein by reference in their entirety.

FIELD

Disclosed embodiments relate to a rail vehicle brake system and to a method for operating a rail vehicle brake system.

BACKGROUND

The braking effect of a rail vehicle brake system is dependent on the interface between the rail vehicle wheels and the rail track on which the rail vehicle wheels are positioned and, secondly, on the interface between the friction linings which are pressed against the brake disk during the braking process and the friction face of the brake disk.

During the configuration of such a rail vehicle brake system it is necessary to take into account not only other parameters but also the wheel diameter of the wheels which are positioned on the rail tracks. To do this, brake assessment journeys are carried out with which, on the one hand, compliance with a necessary braking distance and the maximum utilization of adhesion between a wheel and the rail track, which must not be exceeded during a braking operation, even with completely worn wheels and therefore the maximum braking force at the contact point, are given attention.

These brake assessment journeys are usually detected here with non-worn wheels. The results of the brake assessment journey are subsequently converted to worn or semi-worn wheels.

For the configuration of the braking force or of the braking torque of the rail vehicle brake system with respect to the interface between the friction face of the brake disk and the brake linings, an average coefficient of friction between the brake lining and the brake disk is assumed, wherein during a braking operation the braking torque is varied, mainly as a result of fluctuations of the coefficient of friction between the brake lining and the brake disk.

At the interface between the wheels and the rail track, optimum configuration of the brake with respect to optimum efficiency, that is to say a minimum braking distance, or wear is difficult owing to variable peripheral conditions, in particular a varying braking torque and a wheel diameter which gradually reduces over the service life of the wheels, since a compromise always has to be selected between the bandwidth of the influence from the wheel diameter.

SUMMARY

Disclosed embodiments provide an improved rail vehicle brake system and improved method for operating such a rail vehicle brake system.

In accordance with at least one embodiment, the rail vehicle brake system may have at least one disk brake which is assigned to a wheel or a wheel set. The disk brake may have at least one brake disk, at least one brake lining which interacts with the brake disk, at least one brake application device which applies a brake application force to the at least one brake lining during a braking process, and a control device for controlling the brake application device.

In accordance with at least one embodiment, the control device is coupled to a determination unit for determining a current wheel diameter of the wheel or of the wheel set. In this context, the control device is embodied in such a way that a value of the current wheel diameter which is detected by the determination unit is taken into account when a predetermined brake application force is actuated during a braking process.

Using such a determination unit makes it possible to adapt the brake application force applied to the brake linings to the current wheel diameters of the wheels of the rail vehicle and thereby optimize the efficiency of the rail vehicle brake system over the entire service life of the wheels of the rail vehicle.

DETAILED DESCRIPTION

Figure 1:
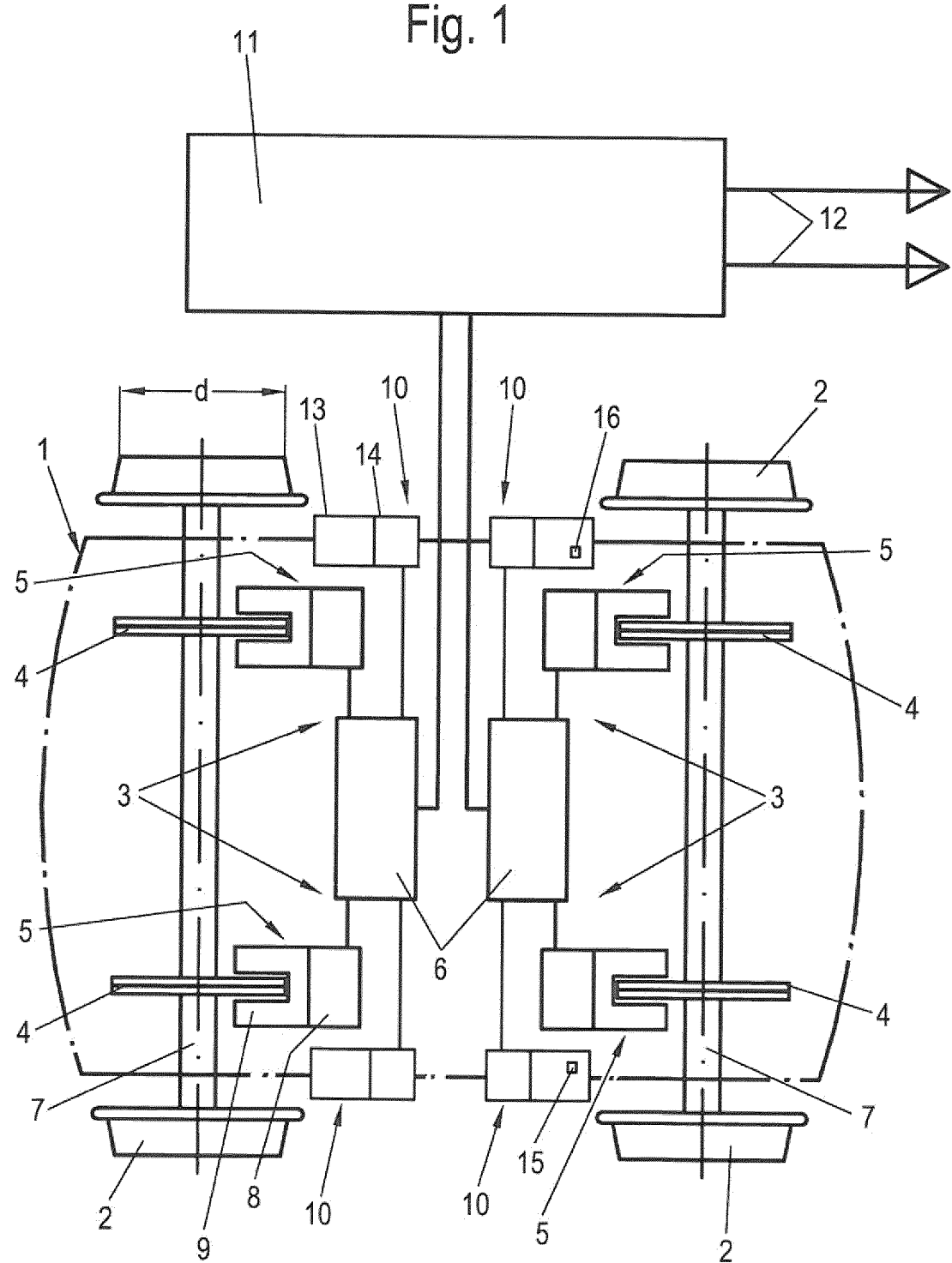
FIG. 1 shows a schematic illustration of an embodiment variant of a rail vehicle brake system.

In the method in accordance with at least one embodiment for operating a rail vehicle brake system, in a first method step the determination unit is activated. In a second method step a current wheel diameter of the wheel or of the wheel set is determined by means of the determination unit.

In a further method step, the current wheel diameter of the wheel or of the wheel set is transferred to the control device. The brake application device of the rail vehicle brake system is actuated in a fourth method step by means of the control device taking into account the current wheel diameter of the wheel or of the wheel set.

As result, the brake application unit and therefore the braking force applied thereby can be actuated in a way which is adapted to the wheel diameter of the wheel of the rail vehicle, as result of which the efficiency of the rail vehicle brake system is optimized over the entire service life of the wheels of the rail vehicle.

Advantageous developments are the subject matter of the dependent claims.

In one embodiment variant of the rail vehicle brake system, the determination unit has at least one sensor device. The sensor device may have a sensor which measures the wheel diameter and/or a sensor which measures the current wheel rotational speed.

The sensor device may have a sensor which measures the wheel diameter; the wheel diameter then can be passed on by the sensor according to the wheel diameter directly via the sensor device to the determination unit and from there to the control device in which the current wheel diameter is included in the calculation of the necessary brake application force.

The determination unit having a sensor device having a sensor which measures the current wheel rotational speed enables the ability to infer the current wheel diameter of the wheel using the wheel rotational speed and the speed of the wheel relative to the rail track. This may be performed in an evaluation unit of the determination unit.

It is also conceivable to integrate such an evaluation unit into the control device.

The determination unit is embodied, according to one embodiment variant, as an integral, stand-alone component of the control device. It is also conceivable to embody the determination unit as a separate functional unit.

Embodying the determination unit as an integral, stand-alone component of the control unit ensures a particularly compact design of the rail vehicle brake system.

In the following description of the figures, terms such as top, bottom, on the left, on the right, at the front, at the rear etc. relate exclusively to the exemplary illustration and position of the brake application device, of the brake disk, of the determination unit, of the wheels, of the wheel diameter, of the control unit and the like which are selected in the respective figures. These terms are not to be understood as restrictive, that is to say these references can change as a result of different working positions or the mirror-symmetrical configuration or the like.

FIG. 1 illustrates an embodiment variant of a rail vehicle brake system according to disclosed embodiments in a schematic view. The reference number 1 denotes here a rail vehicle having a plurality of wheels 2 which are arranged on the respective axles 7. For the sake of simplified illustration, the rail vehicle 1 which is illustrated here is composed of merely one car or power car. Of course, such a rail vehicle can also be composed of a plurality of cars which are coupled to one another, wherein the components of the rail vehicle brake system are also coupled to one another via a rail vehicle control unit 11. An output 12 of the rail vehicle control unit 11 indicates connections to control units of further cars of the train configuration.

Furthermore, brake disks 4 of respective disk brakes 3 are mounted on the axles 7 of the rail vehicle 1. Each disk brake 3 has here in addition to the brake disk 4 at least one brake lining (not shown) which interacts with the brake disk 4, as well as at least one brake application device 5 which applies to the at least one brake lining a brake application force during a braking process.

The two brake application devices 5 are controlled here via a control device 6. The disk brake 3 also has, as a component of the brake application devices 5, at least one brake cylinder 8 and a brake caliper 9, wherein the brake linings (not shown) with friction faces are arranged on each side of the brake disk 4. Alternatively, a brake application device 5 can also contain more than one brake caliper 9 which are actuated by a braking force generator 8.

Various components of the disk brakes are not illustrated in FIG. 1, since their functions and the function of such a disk brake are known per se and will not be explained here in more detail.

The control units 6 are also coupled to respective determination units 10 for determining a current wheel diameter d of the respective wheel 2.

The determination unit 10 has, according to one preferred embodiment variant, at least one sensor device 13. In a preferred embodiment variant, this sensor device 13 is equipped with a sensor 15 which measures the wheel diameter d. The sensor 15 is embodied here, for example, as an optical, mechanical or as an acoustic sensor.

With such a sensor 15 which measures the wheel diameter it becomes possible to determine a current wheel diameter d which, when activation occurs, passes on the current wheel diameter d of the wheel to the control device 6 in which the current wheel diameter d is included in the calculation of the brake application force which is to be applied by the brake application device.

In one alternative embodiment variant, the determination unit 10 has an evaluation unit 14. As a result, when the sensor device is embodied with a sensor 16 which measures the current wheel rotational speed from the measured wheel rotational speed and a current speed of the wheel 2, passed on to the control device 6 via the control unit 11, relative to a rail track on which the wheel 2 is positioned, can occur. The wheel diameter d of the wheel 2 is calculated from these two values in the evaluation unit 14.

The determination unit 10 is preferably embodied as an integral, stand-alone component of the control device 6. It is also conceivable to embody the determination unit 10 as a separate functional unit which is also connected to the control device 6 via a cable connection or else without a cable.

Figure 2:
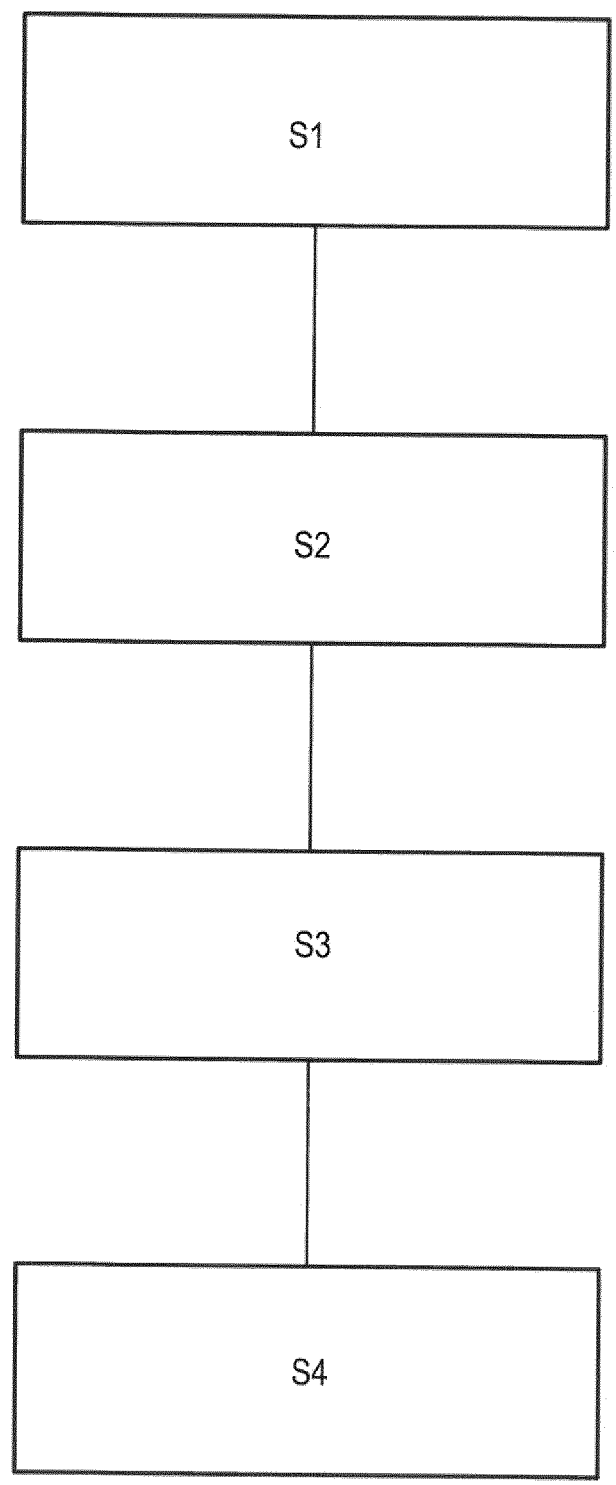
FIG. 2 shows a schematic flowchart of a method according to disclosed embodiments for operating the rail vehicle brake system according to FIG. 1.

A method for operating a rail vehicle brake system as described above is explained in more detail below with reference to FIG. 2.

In a method step S1, the determination unit 10 is activated. This activation can take place automatically or else manually, for example by means of an operator control system in the cockpit of a driver's cab of the rail vehicle 1. According to one embodiment variant, the determination unit 10 is activated at predetermined regular intervals. The intervals can be selected here chronologically, for example hourly or daily, or else be selected as distance intervals, for example as intervals of 1000 km in each case. It is also conceivable to activate the determination unit 10 after every braking process or after every x-th braking process or after the rim turning of the wheels which is associated with a new wheel diameter.

In a second method step S2, the current wheel diameter d of the wheel 2 or of a wheel set is determined by means of the determination unit 10. This may be done, as already described further above, by directly measuring the wheel diameter d of the wheel 2 by means of the sensor device 13 which is equipped with a sensor 15 which measures the wheel diameter d.

Alternatively, the current wheel diameter d is determined by measuring the wheel rotational speed of the wheel 2 and subsequently calculating the wheel diameter d from the measured wheel rotational speed and the speed of the wheel relative to the rail track on which the wheel 2 is positioned.

In a third method step S3, the determined current wheel diameter d of the wheel 2 as described above is transmitted to the control device 6.

Subsequently, in a further method step S4 during the actuation of a braking process the brake application device 5 of the rail vehicle brake system can be actuated by means of the control device 6 taking into account the current wheel diameter d of the wheel 2.

The actuation of the brake application device 5 in method step S4 is preferably controlled in such a way that a braking force which acts at a wheel contact point of the wheel 2 on the rail track does not exceed a predetermined maximum value, in order, in particular, to prevent locking of the wheel on the rail track.

Rail vehicle brake systems of the generic type, such as as are known, for example, from DE 102 45 207 C1, are usually equipped with pneumatic brake systems which have disk brakes.

LIST OF REFERENCE SYMBOLS

1 Rail vehicle
2 Wheel

3 Disk brake
4 Brake disk
5 Brake application device
6 Control device
7 Axle
8 Brake cylinder
9 Brake caliper
10 Determination unit
11 Rail vehicle control unit
12 Connection
13 Sensor device
14 Evaluation unit
15 Sensor
16 Sensor
d Wheel diameter

The invention claimed is:

1. A rail vehicle brake system comprising:
at least one disk brake which is assigned to a wheel of a wheel set, wherein the at least one disk brake interacts with at least one brake lining;
at least one brake application device, which applies a brake application force to the at least one brake lining during a braking process; and
a control device for controlling the brake application device,
wherein the control device is coupled to a determination unit of a plurality of determination units for determining a current wheel diameter of each wheel of the wheel set
wherein the control device is configured to take into account a value of the current wheel diameter detected by the determination unit when a predetermined brake application force is actuated during the braking process, and
wherein each wheel in the rail brake system has a corresponding determination unit of the plurality of determination units, and each determination unit has at least one sensor device, and wherein each corresponding determination unit is automatically activated at predetermined temporal intervals, distance intervals, or number of braking processes and automatically transmits the current wheel diameter to the control device.

2. The rail vehicle of claim 1 wherein the determination unit has an evaluation unit.

3. The rail vehicle brake system of claim 1, wherein the sensor device has a sensor which measures the wheel diameter.

4. The rail vehicle brake system of claim 1, wherein the sensor device has a sensor which measures the current wheel rotational speed.

5. The rail vehicle brake system of claim 1, wherein the determination unit is an integral, stand-alone component of the control device or as a separate functional unit.

6. A method for operating a rail vehicle brake system that includes at least one disk brake assigned to a wheel or to a wheel set, wherein the at least one disk brake interacts with at least one brake lining, at least one brake application device, which applies a brake application force to the at least one brake lining during a braking process, and a control device for controlling the brake application device, wherein the control device is coupled to a determination unit for determining a current wheel diameter of the wheel or of the wheel set, the method comprising:
activating the determination unit to determine the current wheel diameter of the wheel of the wheel set;
determining the current wheel diameter of the wheel of the wheel set;
transmitting the current wheel diameter of the wheel of the wheel set to the control device; and
actuating the brake application device of the rail vehicle brake system by the control device taking into account the current wheel diameter of the wheel of the wheel set,
wherein the actuation of the brake application device is controlled to prevent locking of the wheel on a rail track such that a braking force which acts at a wheel contact point of the wheel on the rail track does not exceed a predetermined maximum value,
wherein each wheel in the rail vehicle brake system has a corresponding determination unit, and each determination unit has at least one sensor device, and the determination unit is automatically activated at predetermined temporal intervals, distance intervals, or number of braking processes and automatically transmits the current wheel diameter to the control device.

7. The method of claim 6, wherein the determination of the current wheel diameter of the wheel or of the wheel set is carried out by measuring the wheel diameter of the wheel or of the wheel set.

8. The method of claim 6, wherein the the determination of the current wheel diameter of the wheel or of the wheel set is carried out by measuring the wheel rotational speed of the wheel or of the wheel set and subsequently calculating the wheel diameter from the measured wheel rotational speed and the speed of the wheel relative to a rail track on which the wheel is positioned.

* * * * *